United States Patent
Tian et al.

(10) Patent No.: US 10,467,033 B2
(45) Date of Patent: Nov. 5, 2019

(54) ENABLING EFFICIENT NESTED VIRTUALIZATION

(75) Inventors: Kun Tian, Shanghai (CN); Yao Zu Dong, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 344 days.

(21) Appl. No.: 13/997,888

(22) PCT Filed: Dec. 22, 2011

(86) PCT No.: PCT/CN2011/084458
§ 371 (c)(1),
(2), (4) Date: Jun. 25, 2013

(87) PCT Pub. No.: WO2013/091221
PCT Pub. Date: Jun. 27, 2013

(65) Prior Publication Data
US 2014/0229943 A1    Aug. 14, 2014

(51) Int. Cl.
*G06F 9/455* (2018.01)

(52) U.S. Cl.
CPC ...... *G06F 9/45533* (2013.01); *G06F 9/45558* (2013.01); *G06F 2009/45566* (2013.01)

(58) Field of Classification Search
CPC ............. G06F 9/45533; G06F 9/45558; G06F 2009/45566
(Continued)

(56) References Cited

U.S. PATENT DOCUMENTS 4,792,895 A * 12/1988 Tallman .................. 718/1
8,479,199 B2 * 7/2013 Day, II ............... G06F 9/45558
                                                           718/1
(Continued)

FOREIGN PATENT DOCUMENTS

| CN | 102096786 A | 6/2011 |
|---|---|---|
| CN | 102103517 A | 6/2011 |
| EP | 2339462 | 6/2011 |

OTHER PUBLICATIONS

Marinos, C., et al. "Inter-domain SLA enforcement in QoS-enabled networks." Remote Instrumentation and Virtual Laboratories. Springer, Boston, MA, 2010. pp. 351-359. (Year: 2010).*

(Continued)

*Primary Examiner* — Meng Ai T An
*Assistant Examiner* — Willy W Huaracha
(74) *Attorney, Agent, or Firm* — Womble Bond Dickinson (US) LLP

(57) ABSTRACT

Embodiments of the invention enable dynamic level boosting of operations across virtualization layers to enable efficient nested virtualization. Embodiments of the invention execute a first virtual machine monitor (VMM) to virtualize system hardware. A nested virtualization environment is created by executing a plurality of upper level VMMs via virtual machines (VMs). These upper level VMMs are used to execute an upper level virtualization layer including an operating system (OS).

During operation of the above described nested virtualization environment, a privileged instruction issued from an OS is trapped and emulated via the respective upper level VMM (i.e., the VMM that creates the VM for that OS). Embodiments of the invention enable the emulation of the privileged instruction via a lower level VMM. In some embodiments, the emulated instruction is executed via the first VMM with little to no involvement of any intermediate virtualization layers residing between the first and upper level VMMs.

15 Claims, 6 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 8,490,090 | B2* | 7/2013 | Ben-Yehuda et al. | 718/1 |
| 2003/0037089 | A1* | 2/2003 | Cota-Robles et al. | 709/1 |
| 2007/0157198 | A1* | 7/2007 | Bennett | G06F 9/45558 718/1 |
| 2009/0007103 | A1* | 1/2009 | Bennett | G06F 9/45558 718/1 |
| 2009/0007112 | A1* | 1/2009 | Moriki | G06F 9/45558 718/1 |
| 2009/0113110 | A1 | 4/2009 | Chen et al. | |
| 2011/0035532 | A1* | 2/2011 | Hall et al. | 711/6 |
| 2011/0047544 | A1* | 2/2011 | Yehuda et al. | 718/1 |
| 2011/0047547 | A1* | 2/2011 | Bennett | G06F 9/45558 718/1 |
| 2011/0072428 | A1* | 3/2011 | Day et al. | 718/1 |
| 2011/0107008 | A1* | 5/2011 | Ben-Yehuda | G06F 12/109 711/6 |
| 2011/0153909 | A1* | 6/2011 | Dong | 711/6 |
| 2012/0131571 | A1* | 5/2012 | Ben-Yehuda et al. | 718/1 |
| 2012/0131574 | A1* | 5/2012 | Day, II | G06F 9/45558 718/1 |
| 2012/0216187 | A1* | 8/2012 | Ben-Yehuda | G06F 9/45558 718/1 |
| 2013/0263118 | A1* | 10/2013 | Kannan et al. | 718/1 |
| 2013/0326519 | A1* | 12/2013 | Anderson | G06F 9/45533 718/1 |

OTHER PUBLICATIONS

Pan, Zhenhao, et al. "Nestcloud: Towards practical nested virtualization." Cloud and Service Computing (CSC), 2011 International Conference on. IEEE, 2011. pp. 321-329. (Year: 2011).*

Qing et al. "Nested Virtualization on Xen", Xen Summit Asia 2009, pp. 1-13. (Year: 2009).*

Zhang, Fengzhe, et al. "CloudVisor: retrofitting protection of virtual machines in multi-tenant cloud with nested virtualization." Proceedings of the Twenty-Third ACM Symposium on Operating Systems Principles. pp. 203-216. (Year: 2011).*

"PCT, International Search Report and Written Opinion of the International Searching Authority for Int'l Application No. PCT/CN2011/084458", (dated Sep. 13, 2012), Whole Document.

Chinese Patent Application CN201180075807.6 (PCT/CN2011/084458), Office Action dated Jul. 1, 2016 with search report.

Office Action (Decision on Rejection) for Chinese Application No. 201180075807.6 dated Dec. 29, 2016.

International Preliminary Report on Patentability received for PCT Patent Application No. PCT/CN2011/084458, dated Jul. 3, 2014, 6 pages.

European Search Report and Search Opinion Received for EP Application No. 11878055.0, dated Jul. 1, 2015, 8 pages.

* cited by examiner

ENABLING EFFICIENT NESTED VIRTUALIZATION

CLAIM OF PRIORITY

This application is a U.S. National Phase application under 35 U.S.C. § 371 of International Application No. PCT/CN2011/084458, filed Dec. 22, 2011, entitled "ENABLING EFFICIENT NESTED VIRTUALIZATION," the entire contents of which are incorporated herein by reference.

FIELD

Embodiments of the invention generally pertain to computing devices, and more particularly to enabling efficient nested virtualization.

BACKGROUND

Systems utilize virtual machines (VMs) to allow the sharing of an underlying physical machine and its resources. The software layer providing virtualization to the VMs is referred to as a virtual machine monitor (VMM) or hypervisor. A VMM acts as a host to the VMs by operating in a super-privileged "root mode," while the VMs run guest operating system (OS) and application software in a "non-root mode" at a normal privilege level. The VMM also presents system software executing on the VMs (e.g., OS and application software) with an abstraction of the physical machine.

The VMM is able to retain selective control of processor resources, physical memory, interrupt management and data input/output (I/O). One method the VMM utilizes to retain control is through a "trap-and-emulate" process. When an OS executed via a VM attempts to execute a privileged instruction that conflicts with another OS or the VMM itself (e.g., access a hardware resource), the VMM "traps" such attempts and "emulates" the effect of the instruction in a manner that does not interfere with the other OS and its own requirements. The emulation by the VMM may itself include privileged instructions which can access hardware resources.

Nested virtualization (also referred to as "layered virtualization") refers to a root-mode VMM running a non-root mode VMM as a guest. The above described trap-and-emulate technique is applied to privileged instructions in the non-root mode VMM, which makes the number of traps for emulating one privileged instruction in an OS exaggerated exponentially in the nested environment. Frequent context switches due to multiple levels of trap-and-emulate greatly hurt overall system performance in such an environment.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of an apparatus, system and method for enabling efficient nested virtualization are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Embodiments of the invention enable dynamic level boosting of operations across virtualization layers to enable efficient nested virtualization. Embodiments of the invention execute a first virtual machine monitor (alternatively referred to herein as the $L_0$ VMM) to virtualize system hardware. A nested virtualization environment is created by executing a plurality of upper level VMMs via virtual machines (VMs). These upper level VMMs are each used to execute an upper level virtualization layer including an operating system (OS).

During operation of the above described nested virtualization environment, a privileged instruction issued from an OS is trapped and emulated via the respective upper level VMM (i.e., the VMM that creates the VM for that OS). The emulation in the respective upper level VMM further includes more privileged instructions which are trapped and emulated by the underlying parent VMM (i.e., the VMM that creates the VM for that upper level VMM). This trap and emulation process may continue until reaching the first VMM, which owns physical resources; this consequently results a long emulation path from the OS's point of view. Embodiments of the invention enable the emulation of the privileged instruction via a lower level VMM. In some embodiments, the emulated instruction is executed via the first VMM with little to no involvement of any intermediate virtualization layers residing between the first and upper level VMMs, and thus provides an efficient nested execution environment.

Figure 1:
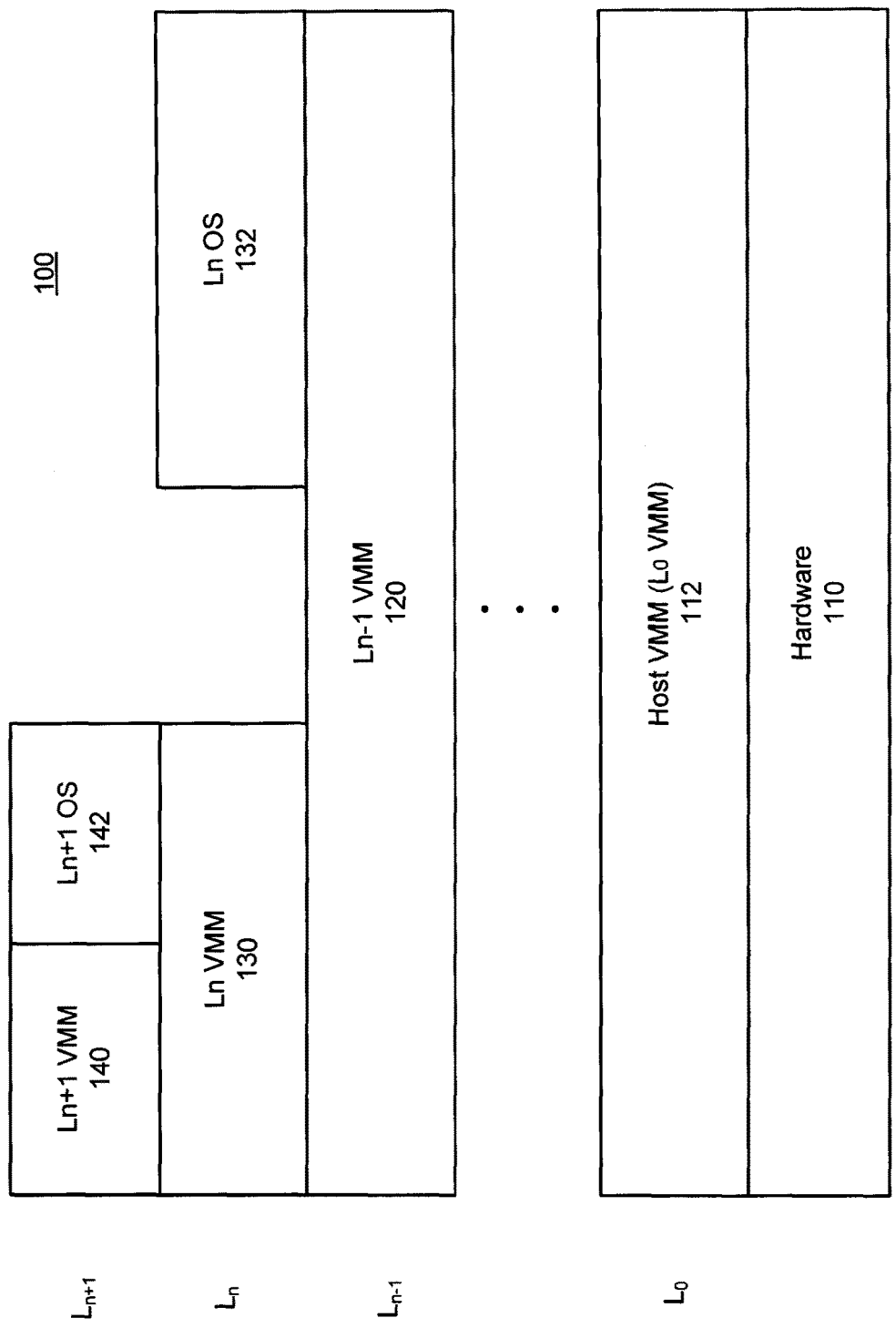
FIG. 1 is a block diagram of a system utilizing nested virtualization according to an embodiment of the invention.

FIG. 1 is a block diagram of a system utilizing nested virtualization according to an embodiment of the invention. System 100 may be included in a system server, desktop computer device, a mobile computer device, or any other any device utilizing a processor and system memory.

As shown in the example embodiment of FIG. 1, system 100 includes system hardware 110 and host VMM 112. Hardware 110 includes a processor (e.g., a single core or multi-core processor, or any other type of processing device such as a general purpose processor, a microcontroller, a signal processor, and application processor, etc.) that supports a super-privileged mode of operation—i.e., "root mode," used by host VMM 112 to support VM environments. "Root mode" as used herein may either refer to a new super-privilege mode introduced by hardware 110 specially for VMM 112 (so that the OS still runs its normal privilege mode without modification), or refer to existing most privileged mode in hardware 110 (by de-privileging the OS to a lower privilege mode with modification). Host VMM 112 may be any hypervisor compatible with hardware 110. For example, host VMM 112 may be a program or module loaded into memory and executed by the processor of hardware 110; host VMM 112 may also be firmware-based or hardware-based.

Host VMM 112 provides a virtualization environment to emulate resources of hardware 110—e.g., processor time slices, memory addresses and I/O resources. These resources may be referred to as virtual resources as they are assigned to the various VMs executing on system 100. Said VMs interpret the virtual resources as if they are included in a dedicated physical machine.

System 100 implements nested virtualization as it includes VMMs executed within virtualization layers as described below. Additional virtualization levels of system 100 are labeled in FIG. 1 as $L_{n-1}$, $L_n$, and $L_{n+1}$. Host VMM 112 may alternatively be referred to herein as $L_0$ VMM, as it is the bottom level virtualization level of the nested virtualization environment shown in FIG. 1.

In this embodiment, $L_{n-1}$ VMM 120 is executed in virtualization layer $L_{n-1}$ (i.e., via a VM at that level) to provide virtualized resources corresponding to hardware 110 to an OS (i.e., $L_n$ OS 132) and a VMM (i.e., $L_n$ VMM 130) one level higher; $L_n$ VMM 130 is executed in virtualization layer $L_n$ (i.e., via a VM at that level) to provide virtualized resources corresponding to hardware 110 to an OS one level higher (i.e., $L_{n+1}$ OS 142); and so on for any additional virtualization layers in system 100, such as layer $L_{n+1}$ including VMM 140.

OS 132 and 142 operate at a "non-root mode", so that any attempts to execute privileged instructions are subjected to a "trap-and-emulate process". System hardware 110 traps individual privileged instructions issued by an OS (e.g., $L_n$ OS 132). In one embodiment, system hardware 110 may directly inject a trap event into parent "non-root mode" VMM 120(which creates the VM for said OS). In another embodiment, system hardware 110 may first deliver the trap event to root-mode host VMM 112, and then root-mode host VMM 112 injects a virtual trap event into upper level VMMs until reaching parent "non-root mode" VMM 120. In both embodiments, VMM 120 then starts the emulation process for said privileged instruction, which may include more privileged instructions (e.g., VMREAD and VMWRITE instructions) which may then further trigger more "trap-and-emulate" process following same flow as described above.

For prior art solutions executing nested virtualization environments such as system 100, the overhead to run a VM at layer Ln is much higher than running a VM at level $L_{n-1}$, because a normal trap-and-emulation path in the $L_n$ layer incurs multiple further trap-and-emulation paths to be serviced by $L_{n-1}$ VMM 120 (and thus, iterate until reaching host VMM 112). The overhead for running a VM at level $L_{n+1}$ is even higher, comparatively speaking, as a normal trap-and-emulation path in the $L_{n+1}$ layer incurs multiple further trap-and-emulation paths to be serviced by $L_n$ VMM 130, and thus $L_{n-1}$ VMM 120 along with host VMM 112, and so forth for additional virtualization layers.

Embodiments of the invention provide an approach for constructing a boundless nested virtualization environment, wherein an OS executing within a virtualization level (e.g., $L_n$ OS 132, $L_{n+1}$ OS 142) is able to dynamically "level boost" its trap-and-emulation paths—i.e. traverse across virtualization boundaries to a lower level VMM to improve performance. In some embodiments, said trap-and-emulation paths may be level-boosted to $L_0$ VMM 112, with little to no involvement of any intermediate virtualization layers.

Figure 2:
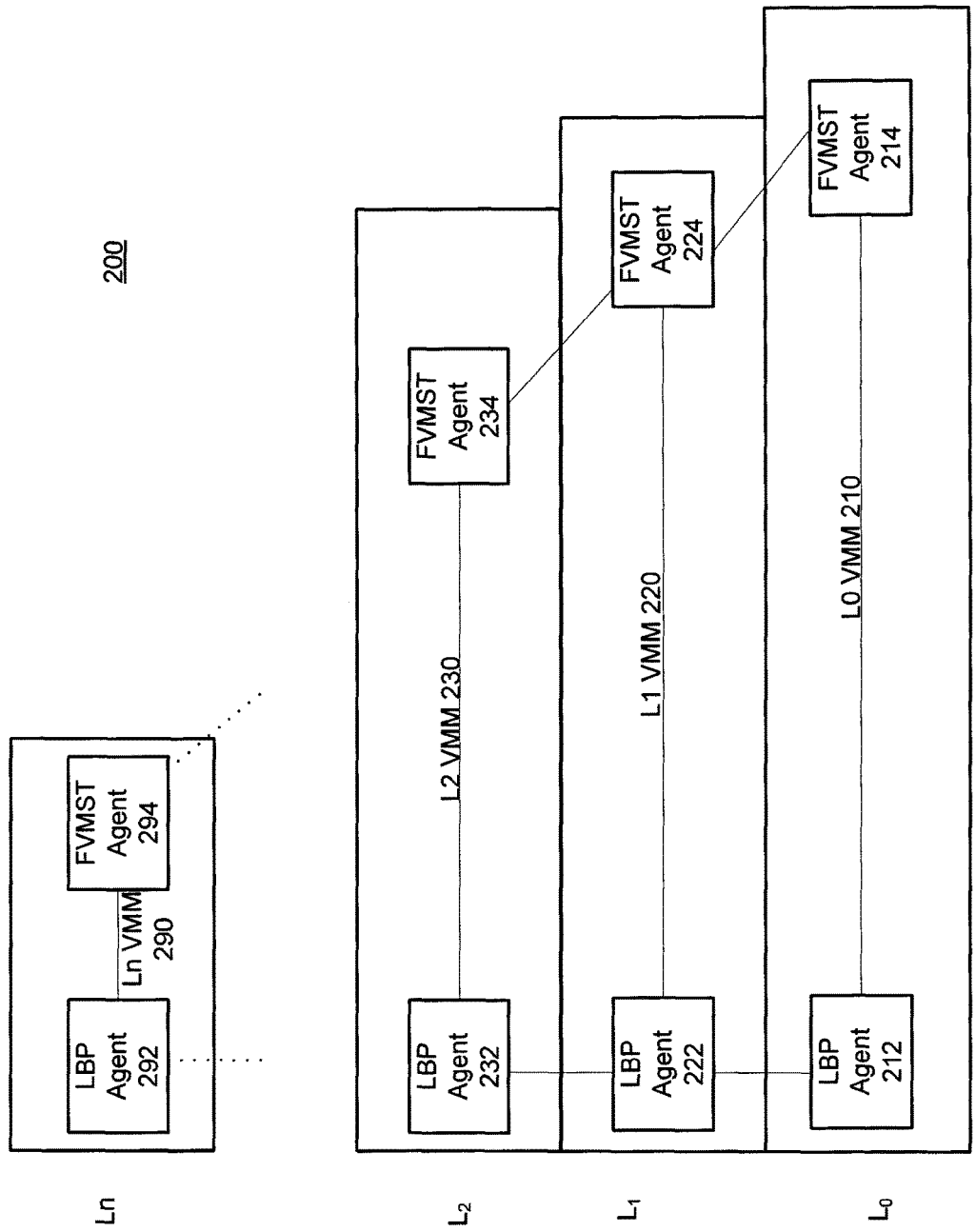
FIG. 2 is a block diagram of nested VMMs according to an embodiment of the invention.

FIG. 2 is a block diagram of nested VMMs according to an embodiment of the invention. In this embodiment, $L_0$ VMM 210 functions as the primary root-mode VMM of system 200, and nested VMMs 220, 230 and 290 function as nested guest non-root mode VMMs. Other embodiments of the invention may include more or less virtualization levels shown in this example, and may include more non-root mode VMMs in each virtualization level.

Each of said VMMs includes a Level Boost Policy (LBP) agent to either issue level boost requests to its parent VMM (i.e., the one creating VM for said VMM), or determine whether a level boost request from an upper level virtualization layer is appropriate. In this embodiment, LBP agents 222, 232 and 292 are linked with LBP agent 212 in a chain configuration to determine whether a virtualization instruction executed by any of upper level VMMs (e.g., 230 and 290) are able to be level boosted and how any system Service Level Agreement (SLA) should be enforced at each level. Such SLA policies may include security/permission considerations, resource availability, performance indicators, etc. under the control of the administrator of system 200.

There may be various sources that trigger an LBP agent to issue a level boost request. In one embodiment, the administrator of system 200 may ask a specific LBP agent to do a level boost with a target boost level specified, based on some dynamic policy changes. In other embodiments, a heuristic approach may be used by each LBP agent that dynamically issues a level boost request under some special condition. In one embodiment, the level boost request may be triggered when a sensitive instruction or a series of sensitive instructions are effectively emulated in lower layers. In another embodiment, the SLA would be broken if continuing to run in current virtualization layer, and thus a level boost is desired. Also it is to be understood that embodiments of the invention do not necessarily limit the frequency of consequent level boost requests for a given OS.

For example, if an upper level VMM such as $L_2$ VMM 230 attempts to level boost an OS executed included in virtualization layer $L_3$, it issues a request to $L_1$ LBP 222 from LBP agent 232; said request from LBP agent 232 may further include SLA information describing the SLA policy that was allocated for the OS included in virtual layer $L_3$. $L_1$ VMM 220 may subsequently merge the SLA policy information of $L_2$ VMM 230 with SLA information carried in the level boost request to ensure that no SLA policies are violated. Subsequently $L_1$ VMM 220 may send a level boost request to $L_0$ VMM 210 via $L_0$ LBP agent 212, if further a level boost is feasible and requested. In such scenarios where SLA policies are violated in any layer, the level boosting request is rejected by destination LBP agent and no further action is taken.

In one embodiment of the invention, level boost requests issued from upper level LBP agents provide next level LBP agent with virtual infrastructure information that each respective VMM configures for their managed VMs, such as virtual network settings (IP/MAC/VLAN/etc.) and virtual storage settings (image/format/etc.). Such information would be informative for next level VMM to reconstruct the VM execution environment when level boost happens. Said infrastructure information may be in a neutral format to allow for heterogeneous VMMs joining in the boundless framework for system 200.

In some embodiments of the invention, when a VMM (230, 220 or 210) executes a level boost request issued by an upper level VMM, the appropriate virtual processor context (e.g., virtual processor register contexts), virtual memory contents and virtual device context (e.g., OS properties) of the boosted OS are fully copied from the upper level VMM to said VMM; however, this process (referred to herein as "live migration", in a similar manner as moving the VM from one system to another system) may be time-consuming and slow, and further does not honor the fact that migration happens in the local system 200. Multiple copy instructions may need to be executed to ensure short VM downtime. Furthermore, live migration may result in unnecessary resource duplication because all resources (memory pages, virtual disks, etc.) will be duplicated among multiple virtualization layers involved in the level boost process, as live migration processes assume the destination is a new host. Thus, embodiments utilizing live migration may not be optimal for systems with limited resources, or the system with frequent level boost requirement.

In the embodiment illustrated in FIG. 2, upper level VMMs 220, 230 and 290 each include Fast VM State Transfer (FVMST) agents 224, 234 and 294 respectively. Said FVMST agents are linked together with FVMST agent 214 included in $L_0$ VMM 210 in chained manner, in order to transfer a minimal amount of virtual processor state, virtual memory contests and virtual device state in a level boost action. The rest of the virtual context can be reconstructed by destination FMST agent in an intelligent and efficient way.

Figure 3:
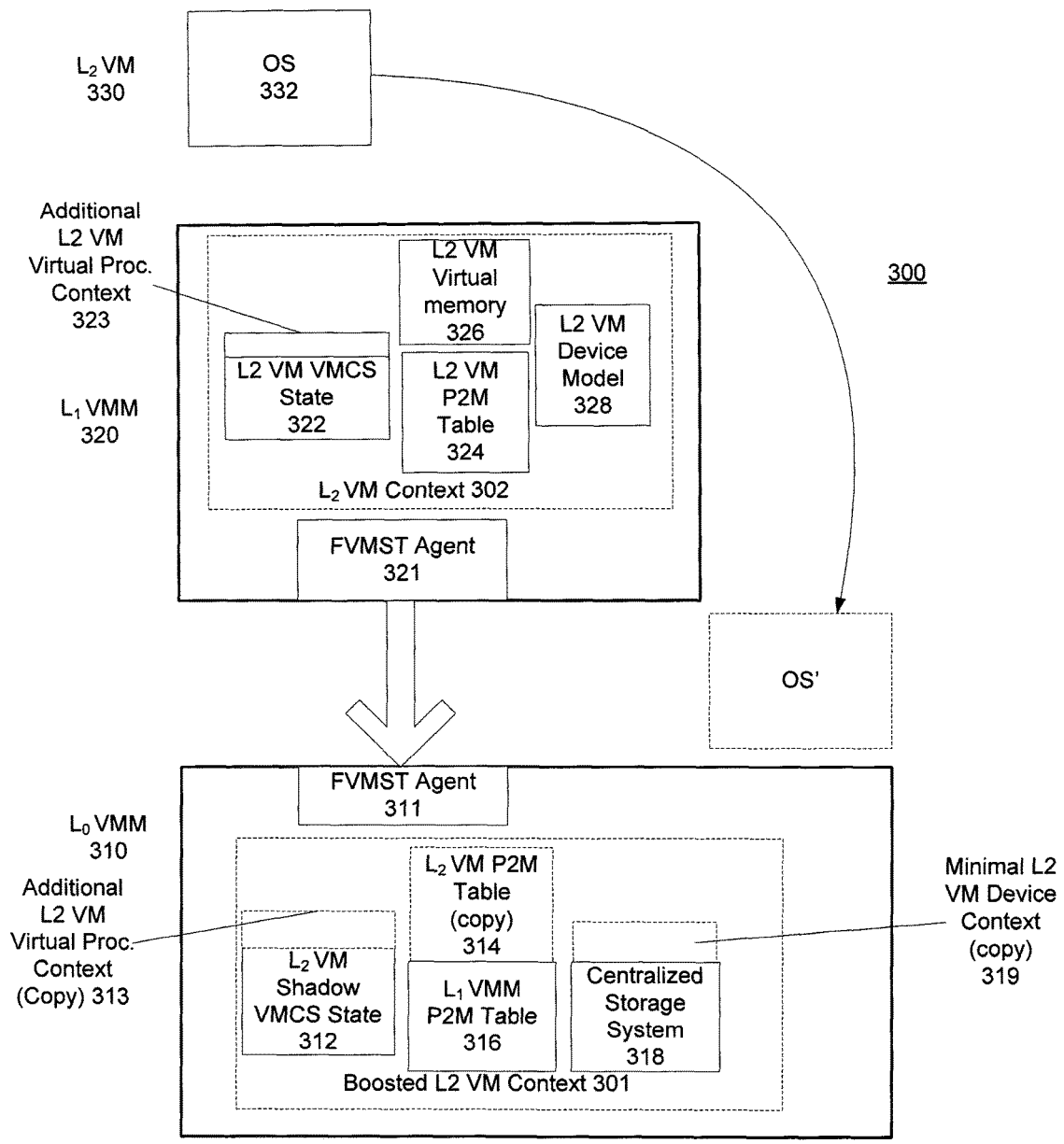
FIG. 3 is a block diagram illustrating fast virtual machine state transfer according to an embodiment of the invention.

FIG. 3 is a block diagram illustrating fast virtual machine state transfer according to an embodiment of the invention. In the event of a level-boost request as described above, an FVMST agent of system 300 included in an upper level VMM may only copy a limited amount of virtual layer context to a FVMST module included in the next level VMM shown as dashed boxes in boosted $L_2$ VM context 301 and is described below.

In the example embodiment illustrated in FIG. 3, nested virtualization system 300 includes upper layer $L_1$ VMM 320, which is shown to level boost $L_2$ VM 330 executing $L_2$ OS 332. $L_1$ VMM 320 is shown to include virtual processor context 323, Physical-to-Machine (P2M) mapping table 324, virtual memory 326 and device model 328 which together composes a full execution context for $L_2$ VM 330. $L_0/L_1/L_2$ are used here as an example.

Full virtual processor context 323 of $L_2$ VM 330 may not necessarily need to be copied in its entirety to $L_0$ VMM 310, depending on the how nested virtualization is implemented in system 300. In some of embodiments, the physical processor of system 300 may provide a one-level virtualization architecture, where only $L_0$ VMM 310 is allowed to control "non-root mode" execution environment. All the upper level VMMs are supported by trap-and-emulate its control attempts to "non-root mode" execution environment in $L_0$ VMM 310. Said one-level virtualization architecture may utilize a Virtual Machine Control Structure (VMCS).

In this embodiment, $L_0$ VMM 310 utilizes a VMCS to store information for controlling "non-root mode" execution environment on the physical processors of system 300 (one VMCS structure for each virtual processor) and the states of each virtual machine in the system. The VMCS may further contain, for example, state of the guests, state of the $L_0$ VMM, and control information indicating under which conditions the $L_0$ VMM wishes to regain control during guest execution. The one or more processors in system 300 may read information from the VMCS to determine the execution environment of a VM and VMM, and to constrain the behavior of the guest software appropriately. VMCS may not contain all the virtual processor context, with a minimal set of states (e.g. some MSR contents, virtual interrupt states, etc.) maintained by $L_0$ VMM in its own format, as shown in additional virtual processor context 323.

In this embodiment, a VMCS state 322 is prepared by $L_1$ VMM 320 for its respective OS (i.e., upper level OS such as $L_2$ OS 332). The attempts by $L_1$ VMM 320 to operate VMCS 322 are trapped by the system 300 so that $L_0$ VMM 310 can emulate the hardware behavior. Consequently $L_0$ VMM 310 creates a shadow VMCS based on captured settings for the $L_2$ OS 332 (carried by VMCS 322) and its own settings (i.e., the $L_0$ VMM settings) for the $L_1$ VMM, shown in FIG. 3 as $L_2$ VM shadow VMCS state 312. Thus, $L_2$ OS 332 may be run under the control of a shadow VMCS.

Therefore, $L_0$ VMM 310 already includes the majority of the virtual processor state (i.e., $L_2$ VM shadow VMCS state 312) to support the correct execution of $L_2$ OS 332. So FVMST agents only exchange a minimal set of virtual processor context—i.e., the context which is not contained in VMCS 312, such as emulated Model-Specific Registers (MSRs), pending virtual interrupts, etc. Only this small portion of virtual process state is transferred from FVMST agent 321 to FVMST agent 311 to enable a fast VM state transfer, and is shown as additional virtual processor context (copy) 313.

In some embodiments, the physical processor of system 300 may support "non-root mode" VMMs to operate VMCS directly, in a so-called multiple-level virtualization support manner. In such case, the upper level VMCS needs be copied so that full virtual processor context can be correctly reconstructed.

Copying virtual memory contents is typically the most time-consuming resource transferred in live migration mode. Thus, embodiment of the invention utilize the fact that nested virtualization system 300 is included in a single local machine, and utilize a sharing protocol to significantly reduce copying operations. In this embodiment, the only structure to be transferred between $L_1$ VMM 320 and $L_0$ VMM 310 is P2M mapping table 324 (a copy of which is shown as table 314), which describes how guest physical addresses (and thus $L_2$ VM virtual memory 326) in the $L_2$ OS are mapped to the "machine addresses" in the $L_1$ VMM's view. $L_0$ VMM 310 further creates a P2M table for $L_1$ VMM 320 (shown as element 316), which translates the "machine address" in the $L_1$ VMM's view to the machine address in the $L_0$ VMM's view. Utilizing both P2M tables, $L_0$ VMM 310 may translate the $L_2$ OS guest physical addresses to the "machine address" in the $L_0$ VMM's view. Therefore, $L_0$ VMM 310 can reuse the same memory pages (i.e. virtual memory 326) allocated to the $L_2$ OS without incurring any copy operation overhead and resource duplication, and thus allow for a more flexible virtualization layer traverse. In some embodiments, $L_1$ VMM 310 still marks those memory pages allocated from its pool to avoid confliction usage by both VMMs.

In embodiments where a hardware extended paging technique (EPT) is utilized, and where the nested virtualization implementation exposes virtual EPT (vEPT) to every nested level, FVMST agents may further skip the transmission of P2M table 324, as to virtualize the vEPT intrinsically requires pushing P2M translation information for $L_2$ OS down to $L_0$ VMM 310, in a similar manner as the VMCS part.

Figure 4:
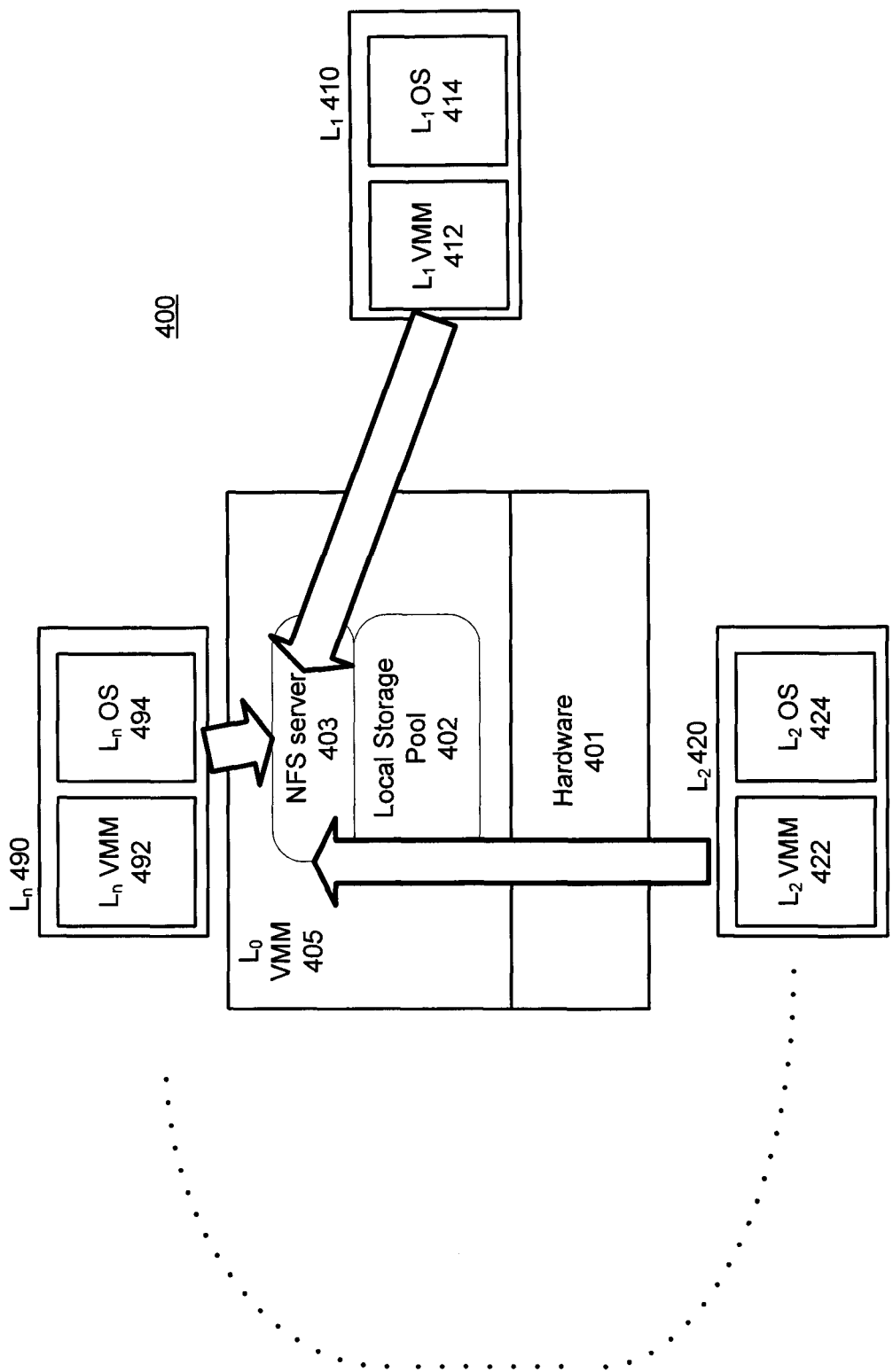
FIG. 4 illustrates a storage hierarchy for a nested virtualization environment according to an embodiment of the invention.

Device model 328 tracks the virtual platform state for the $L_2$ VM, including a variety of device emulation logic, e.g., virtual disk, virtual Network Interrupt Card (NIC), virtual timer, virtual CDROM, etc. Most virtual devices have a small state context which can be quickly transferred by the FMVST agent, except two special types: virtual disk and virtual NIC. Virtual disk is the largest context within device model, which contains the file system of $L_2$ OS. Transferring such large trunk of data is even more time-consuming than transferring memory pages. In some embodiments of the invention, device models for VMMs, such as device model 328, implements the virtual disk in a centralized storage block (an example of which is illustrated in FIG. 4 and described below), which can be directly accessed by all related VMMs if permission is allowed. This removes the heaviest obstacle against fast state transfer. On the other hand, virtual NIC is almost stateless, with its receive/transmit queues simply acting as a pipe between external world and VM. What matters are the configuration parameters around virtual NIC, e.g., IP address, MAC address, NAT setting, VLAN ID, etc. As discussed above, this part of static information may be pre-transferred through an LBP agent to avoid occupying extra time in this phase. Thus, FMVST agents 321 and 311 need only exchange a minimal amount of data, shown as element 319, for boosted $L_2$ VM context 301.

FIG. 4 illustrates a storage hierarchy for a nested virtualization environment according to an embodiment of the invention. In this embodiment, a central storage hierarchy is utilized in place of instead of duplicating virtual images in every nested layer.

In this embodiment, all images of virtualization layers $L_1$ 410, $L_2$ 420 . . . and $L_n$ 490 are hosted on local disk storage pool 402 included in hardware 401 of system 400. $L_0$ VMM 405 establishes local network file server (NFS) 403, and exposes it to all upper level VMMs, including $L_1$ VMM 412, $L_2$ VMM 422 and $L_n$ VMM 492 (alternatively, systems may utilize a remote NFS rather than local disk storage without deviating from embodiments of the invention); said upper level VMMs use local NFS 403 to access their virtualization layer image. Permission control policy may be enforced so that unwanted access is prohibited from other layers when a level boost is not triggered. Therefore, in this embodiment, the above described level-boost operations do not require copying any virtual state content, as VMMs are able to access any VMM virtual image.

In embodiments that utilize hardware input/output memory management units (IOMMU) to allow device pass-throughs, no additional action is required except to maintain the same virtual bus position as what the upper level OS (e.g., $L_1$ OS 414, $L_2$ OS 424 and $L_n$ OS 494) already observe. The IOMMU mapping table already contains the mapping information to map from upper level physical addresses to real machine addresses, and thus there is no need to modify it. Thus, in embodiments of the invention creating boundless nested virtualization environments, device direct memory accesses (DMAs) may still route to their original destination since the same physical pages are used across nested layers.

Embodiments of the invention thus reduce overheard processing associated with a boundless nested virtualization environment, thereby increasing the usefulness of such environments. For example, embodiments of the invention may be used to significantly improve the performance of legacy applications when they are executed within a VM by an OS which is virtualized by another VMM. By level boosting the legacy applications to the same level as its hosting OS, as described above, performance is greatly improved. In another example, nested virtualization may be used to develop and test a VMM; by utilizing embodiments of the invention, one can level boost all upper level OS operations to $L_0$ VMM 405, reconstruct an upper level VMM with a new patched binary, and then move all OS operations back to the patched VMM without service interruption and virtual infrastructure reconstruction. In another example, level boosting may be used to compensate feature-missing environments, by boosting a VM from a less-powerful VMM, which lacks of emulating some features (such as 3D graphics computing, Single SIMD (Single Instruction Multiple Data) Extensions (SSE) instructions, etc.), down to a more-powerful VMM with necessary the feature. This can be done back-and-forth dynamically based on whether applications within that VM actually require said feature.

Figure 5:
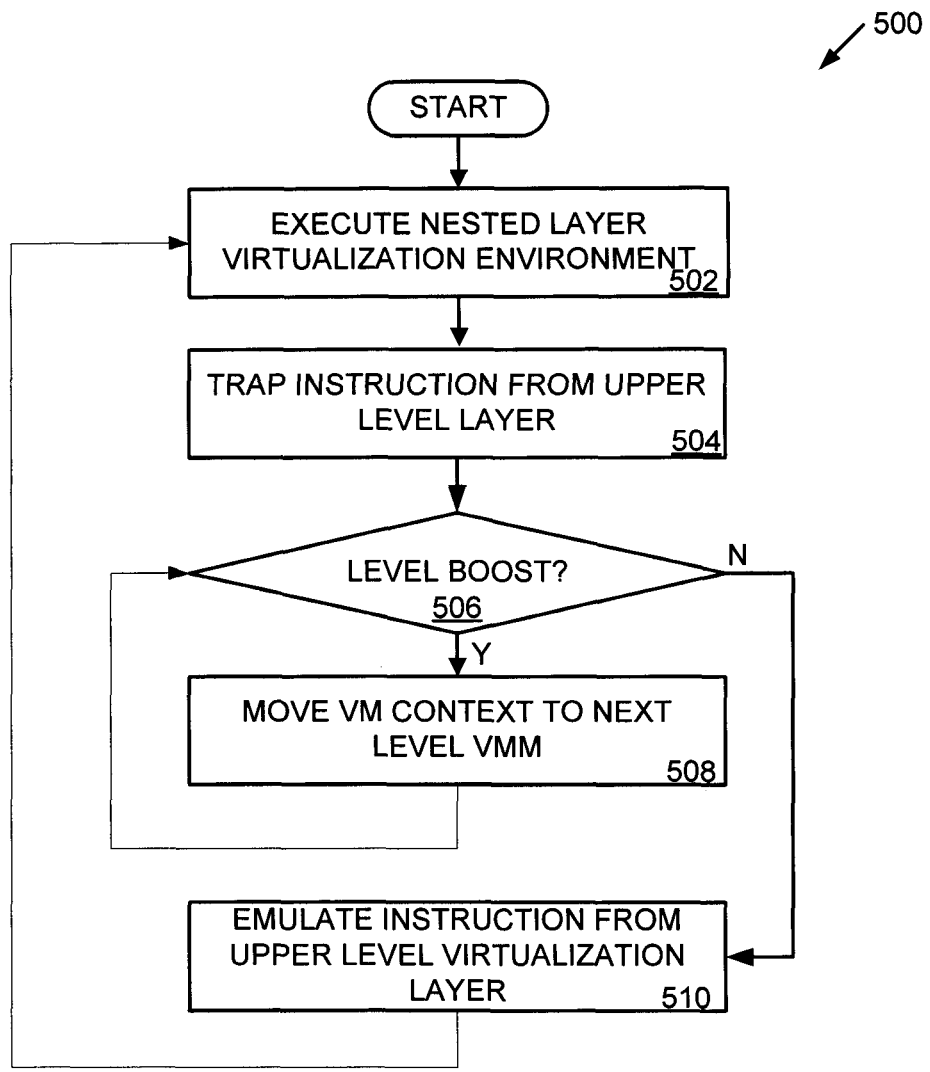
FIG. 5 is a flow diagram of a process according to an embodiment of the invention.

FIG. 5 is a flow diagram of a process according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 500 is implemented in a system that is capable of executing a nested virtualization environment, shown as processing block 502. Said nested virtualization environment may comprise any of the example embodiments described above—i.e., a root mode VMM managing a first upper level virtualization layer, and one or more "non-root" mode VMMs managing additional upper level virtualization layers.

Processing block 504 is executed to detect and trap a privileged instruction issued from an upper level OS. To enhance system performance, it is determined whether the trapped instruction may be "level-boosted"—i.e., emulated by the lower level VMM rather than the upper level non-root mode VMM managing the OS that issued the privileged instruction. The determination may come from several sources: spontaneous request based on an administrative decision, or a heuristics decision based on configured polices. If it is determined that the OS may be level boosted, 506. The appropriate VM context is moved (e.g., copied) to the next (i.e., lower) level VMM, 508. As described above, there may be scenarios where requests to level boost said instruction is denied—e.g., a violation of an SLA policy. In such scenarios, the level boosting may be reverted if necessary.

Said level boost operations may continue until the lowest possible level VMM (e.g. the root mode VMM) is reached. As described above, in other embodiments of the invention, the lowest possible level VMM accesses the appropriate virtualization layer context—i.e., virtual processor context and virtual memory contents, directly with little to no involvement of any intermediate virtualization layers residing between itself and upper level VMMs.

Whether or not the instruction is level boosted, it is still emulated via one of the VMMs, 510, and the nested virtualization environment continues to execute. As described above, embodiments of the invention will typically level boost the request, significantly increasing performance over prior art solutions. As said in some examples, level boost may be reverse-ordered by moving a VM back to upper level VMM, when earlier level boost request is not valid any more. This is however not reflected in this process example.

Figure 6:
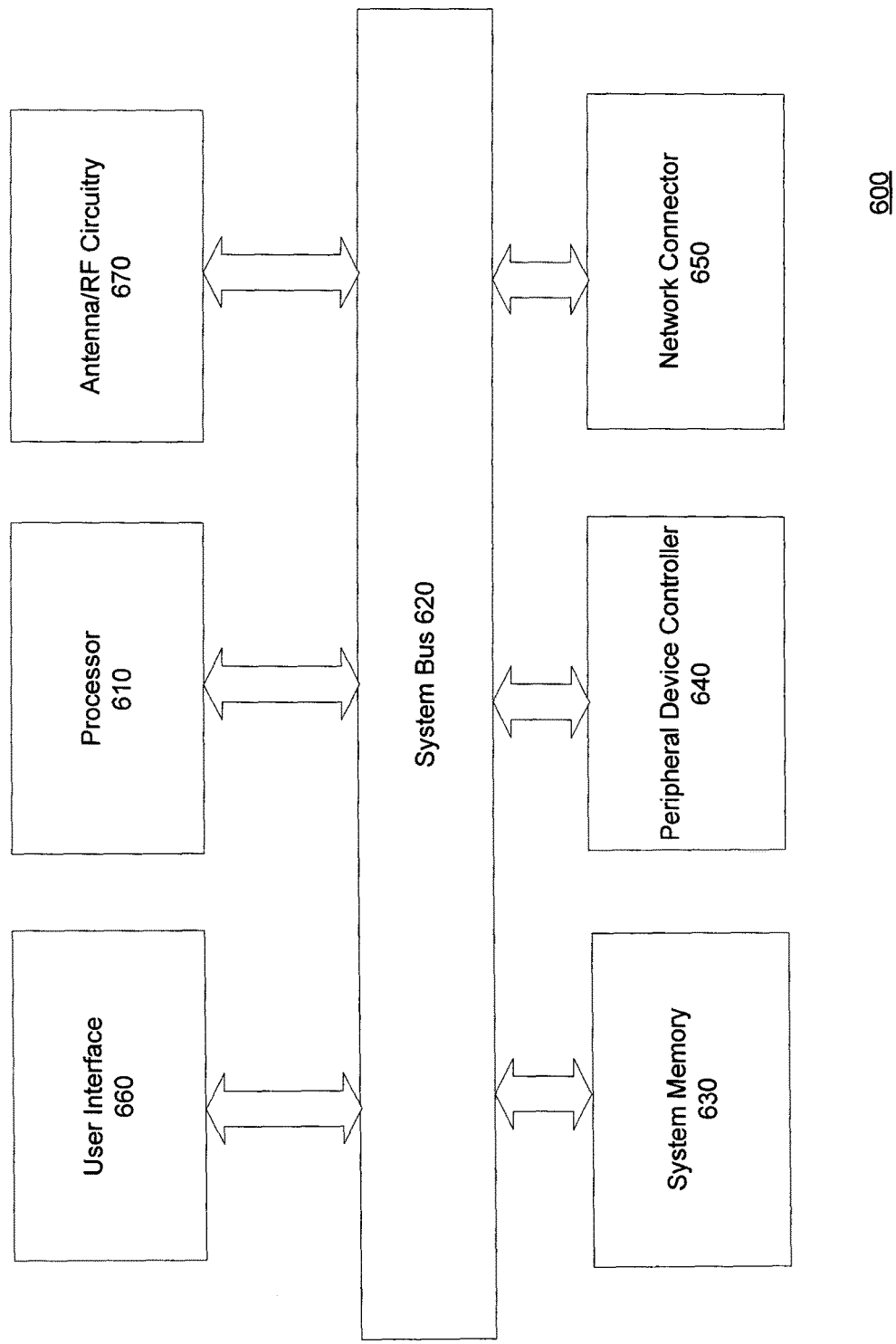
FIG. 6 is a block diagram of a system that may utilize an embodiment of the invention.

FIG. 6 is a block diagram of a system that may utilize an embodiment of the invention. System 600 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 600 may include processor 610 to exchange data, via system bus 620, with user interface 660, system memory 630, peripheral device controller 640 and network connector 650. Said system hardware may be virtualized via a hypervisor or VMM. System 600 may further execute a nested virtualization environment, and dynamically level boost operations across virtualization layers as described above.

System 600 may further include antenna and RF circuitry 670 to send and receive signals to be processed by the various elements of system 600. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 600 may include multiple physical antennas.

While shown to be separate from network connector 650, it is to be understood that in other embodiments, antenna and RF circuitry 670 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, ASICs, DSPs, etc.), embedded controllers, hardwired circuitry, etc. Software content (e.g., data, instructions, configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A method for enabling efficient nested virtualization, comprising:
   executing a host virtual machine monitor (VMM) to virtualize system hardware;
   executing a plurality of nested VMMs via virtual machines (VMs) to create a nested virtualization environment, wherein the plurality of nested VMMs comprises an upper level VMM, and at least one lower level VMM as an intermediate virtualization layer residing between the host VMM and the upper level VMM, wherein the host VMM is the bottom level of the nested virtualization environment and operates in a super-privileged root mode;
   trapping a privileged instruction issued from an upper level Operating System (OS) via the upper level VMM;
   copying a VM execution context from the upper level VMM to the lower level VMM, including:
      copying a physical-to-machine (P2M) mapping table stored in the upper level VMM, wherein the P2M mapping table maps guest physical addresses in the upper level OS to machine addresses in the lower level VMM; and
      transferring the P2M mapping table from the upper level VMM to the lower level VMM;
      creating a shadow Virtual Machine Control Structure (VMCS) based on captured settings for the upper level OS and settings of the lower level VMM which enable the upper level OS to run under the shadow VMCS;
      creating a lower level P2M mapping table for the lower level VMM using the P2M mapping table from the upper level VMM;
      merging a Service Level Agreement (SLA) policy of the upper level VMM with an SLA policy of the upper level OS carried in a level boost request issued by the upper level VMM; and
      emulating the privileged instruction via the lower level VMM, the lower level VMM to receive an indication of the trapped privileged instruction from one of a physical processor of the system hardware or a parent VMM that is hosting the lower level VMM.

2. The method of claim 1, wherein the nested virtualization environment comprises a plurality of intermediate virtualization layers included between the host VMM and the upper level VMM, the host VMM to receive the indication of the trapped privileged instruction directly from the physical processor.

3. The method of claim 1, wherein the upper level VMM to store the execution context in a network file server (NFS), the NFS accessible to the VMMs.

4. The method of claim 3, wherein the NFS is included in a host machine, the host machine further including the nested virtualization environment.

5. The method of claim 1, further comprising:
copying VM configuration parameters from the upper level VMM to the lower level VMM.

6. A non-transitory computer readable storage medium including instructions that, when executed by a processor, cause the processor to perform a method comprising:
executing a host virtual machine monitor (VMM) to virtualize system hardware;
executing a plurality of nested VMMs via virtual machines (VMs) to create a nested virtualization environment, wherein the plurality of nested VMMs comprises an upper level VMM, and at least one lower level VMM as an intermediate virtualization layer residing between the host VMM and the upper level VMM, wherein the host VMM is the bottom level of the nested virtualization environment and operates in a super-privileged root mode;
trapping a privileged instruction issued from an upper level Operating System (OS) via the upper level VMM;
copying a VM execution context from the upper level VMM to the lower level VMM, including:
copying a physical-to-machine (P2M) mapping table stored in the upper level VMM, wherein the P2M mapping table maps guest physical addresses in the upper level OS to machine addresses in the lower level VMM; and
transferring the P2M mapping table from the upper level VMM to the lower level VMM;
creating a shadow Virtual Machine Control Structure (VMCS) based on captured settings for the upper level OS and settings of the lower level VMM which enable the upper level OS to run under the shadow VMCS;
creating a lower level P2M mapping table for the lower level VMM using the P2M mapping table from the upper level VMM;
merging a Service Level Agreement (SLA) policy of the upper level VMM with an SLA policy of the upper level OS carried in a level boost request issued by the upper level VMM; and
emulating the privileged instruction via the lower level VMM, the lower level VMM to receive an indication of the trapped privileged instruction from one of a physical processor of the system hardware or a parent VMM that is hosting the lower level VMM.

7. The non-transitory computer readable storage medium of claim 6, wherein the nested virtualization environment comprises one or more intermediate virtualization layers included between the host VMM and the upper level VMM, and the host VMM to receive the indication of the trapped privileged instruction directly from the physical processor.

8. The non-transitory computer readable storage medium of claim 6, wherein the upper level VMM to store an execution context in a network file server (NFS), and the NFS is accessible to the VMMs.

9. The non-transitory computer readable storage medium of claim 8, wherein the NFS is included in a host machine, the host machine further including the nested virtualization environment.

10. The non-transitory computer readable storage medium of claim 6, the method further comprising:
copying VM configuration parameters from the upper level VMM to the lower level VMM.

11. A system for enabling efficient nested virtualization, comprising:
platform hardware including a processor and a memory;
a host virtual machine monitor (VMM) to present virtualized platform hardware to one or more virtualization layers, wherein the host VMM operates in a super-privileged root mode and is the bottom level of the one or more virtualization layers; and
a plurality of nested VMMs executed via virtual machines (VMs) to create a nested virtualization environment, wherein the plurality of nested VMMs comprises an upper level VMM, and at least one lower level VMM as an intermediate virtualization layer residing between the host VMM and the upper level VMM;
wherein the upper level VMM to further
trap a privileged instruction issued from an Operating System (OS) operating on the upper level VMM, and copy an execution context to the lower level VMM including:
copying a physical-to-machine (P2M) mapping table stored in the upper level VMM, wherein the P2M mapping table maps guest physical addresses in the upper level OS to machine addresses in the lower level VMM,
transferring the P2M mapping table from the upper level VMM to the lower level VMM,
creating a shadow Virtual Machine Control Structure (VMCS) based on captured settings for the upper level OS and settings of the host lower level VMM which enable the upper level OS to run under the shadow VMCS;
creating a lower level P2M mapping table for the lower level VMM using the P2M mapping table from the upper level VMM;
merging Service Level Agreement (SLA) policy of the upper level VMM with an SLA policy of the upper level OS carried in a level boost request issued by the upper level VMM; and
wherein the lower level VMM to further
receive an indication of the trapped privileged instruction from one of the processor of the platform hardware or a parent VMM that is hosting the lower level VMM,
reconstruct the execution context based on the copied execution context, and emulate the privileged instruction.

12. The system of claim 11, further comprising:
wherein the root mode VMM to receive an indication of the trapped privileged instruction directly from the processor of the platform hardware.

13. The system of claim 11, further comprising a network file server (NFS) accessible to the VMMs of the system, wherein the non-root VMM to store an execution context in the network file server.

14. The system of claim 13, further comprising a host machine further including NFS, the VMMs to access configuration parameters for the non-root mode VMM stored on the NFS.

15. The system of claim 11, the non-root VMM to further a copy VM configuration parameters to the lower level VMM.

* * * * *